United States Patent
Itoh

(10) Patent No.: US 7,957,856 B2
(45) Date of Patent: Jun. 7, 2011

(54) CONTROL DEVICE AND CONTROL METHOD OF HYBRID VEHICLE

(75) Inventor: Takao Itoh, Seto (JP)

(73) Assignee: Toyota Jidosha Kabushiki Kaisha, Toyota-Shi (JP)

( * ) Notice: Subject to any disclaimer, the term of this patent is extended or adjusted under 35 U.S.C. 154(b) by 80 days.

(21) Appl. No.: 12/558,834

(22) Filed: Sep. 14, 2009

(65) Prior Publication Data

US 2010/0004809 A1 Jan. 7, 2010

(30) Foreign Application Priority Data

Oct. 3, 2008 (JP) ................................ 2008-258647

(51) Int. Cl.
*B60L 9/00* (2006.01)
*B60L 11/00* (2006.01)

(52) U.S. Cl. .................. 701/22; 180/65.21; 180/65.23; 180/65.235; 903/917; 903/919; 903/945; 60/711

(58) Field of Classification Search ................. 701/22; 180/65.21, 65.23, 65.235; 903/917, 919, 903/945; 60/711
See application file for complete search history.

(56) References Cited

U.S. PATENT DOCUMENTS

| | | | | |
|---|---|---|---|---|
| 5,771,478 A * | 6/1998 | Tsukamoto et al. | ............ | 701/68 |
| 5,846,155 A * | 12/1998 | Taniguchi et al. | ................ | 477/2 |
| 5,895,333 A * | 4/1999 | Morisawa et al. | ................ | 475/5 |
| 5,982,045 A * | 11/1999 | Tabata et al. | .................... | 290/17 |
| 6,054,776 A * | 4/2000 | Sumi | ................ | 290/17 |
| 6,081,042 A * | 6/2000 | Tabata et al. | .................... | 290/45 |
| 6,083,138 A * | 7/2000 | Aoyama et al. | .................... | 477/5 |
| 6,183,389 B1 * | 2/2001 | Tabata | ............................. | 477/5 |
| 6,203,468 B1 * | 3/2001 | Nitta et al. | ........................ | 477/5 |
| 6,209,672 B1 * | 4/2001 | Severinsky | ............... | 180/65.23 |
| 6,362,580 B1 * | 3/2002 | Omata et al. | .................. | 318/139 |

(Continued)

FOREIGN PATENT DOCUMENTS

JP 11-272861 * 9/1999

(Continued)

OTHER PUBLICATIONS

Simulation of Gear-shift Algorithm for Automatic Transmission Based on MATLAB; Lu Xi; Xu Xiangyang; Liu Yanfang; Software Engineering, 2009. WCSE '09. WRI World Congress on; vol. 2; Digital Object Identifier: 10.1109/WCSE.2009.198 Publication Year: 2009 , pp. 476-480.*

(Continued)

*Primary Examiner* — Cuong H Nguyen
(74) *Attorney, Agent, or Firm* — Gifford, Krass, Sprinkle, Anderson & Citkowski, P.C.

(57) ABSTRACT

An ECU calculates a drive torque request value Td0 (S102) when a creep torque generation condition is satisfied (YES in S100), calculates a creep torque reflection rate Kcrp using a gear rattle prevention map instead of an ordinary map (S110) when a vehicle speed V is substantially zero and an engine is in a load drive state (YES in S106 and NO in S108) while a forward drive range is being selected (YES in S104), and calculates a product of Td0 and Kcrp as a creep torque request value Tp (S114). The ordinary map is a map decreasing Kcrp to 0 with increase in brake torque, and the gear rattle prevention map is a map decreasing Kcrp to a predetermined value larger than 0 with increase in brake torque.

8 Claims, 9 Drawing Sheets

U.S. PATENT DOCUMENTS

| | | | | |
|---|---|---|---|---|
| 6,428,444 | B1 * | 8/2002 | Tabata | 477/3 |
| 6,441,506 | B2 * | 8/2002 | Nakashima | 290/40 C |
| 6,563,230 | B2 * | 5/2003 | Nada | 290/40 C |
| 6,637,530 | B1 * | 10/2003 | Endo et al. | 180/65.25 |
| 6,805,211 | B2 * | 10/2004 | Fujikawa | 180/65.25 |
| 7,203,578 | B2 * | 4/2007 | Kuang et al. | 701/22 |
| 7,316,283 | B2 * | 1/2008 | Yamamoto et al. | 180/65.235 |
| 7,367,415 | B2 * | 5/2008 | Oliver et al. | 180/65.275 |
| 7,575,079 | B2 * | 8/2009 | Minamikawa | 180/65.285 |
| 2010/0076637 | A1 | 3/2010 | Ueoka | |

FOREIGN PATENT DOCUMENTS

| | | | |
|---|---|---|---|
| JP | 11-287934 | * | 10/1999 |
| JP | 2000-062461 | * | 3/2000 |
| JP | 2000-152521 | * | 5/2000 |
| JP | 2001-303926 | * | 9/2001 |
| JP | 2004-041627 | * | 2/2004 |
| JP | 2006050811 A | | 2/2006 |
| JP | 2007-034542 | * | 2/2007 |
| JP | 2007236168 A | | 9/2007 |
| JP | 2008154394 A | | 7/2008 |
| JP | 2008167540 A | | 7/2008 |

OTHER PUBLICATIONS

Optimized use of an internal-combustion engine with a variable-speed synchronous generator and rectifier; Van Tichelen, P.; Weyen, D.; Power Electronic Drives and Energy Systems for Industrial Growth, 1998. Proceedings. 1998 Inter. Conf. on; vol. 2; Digital Object Identifier: 10.1109/PEDES.1998.1330679; Pub. Year: 1998, pp. 659-664 vol. 2.*

Research on an Axial-Axial Flux Compound-Structure Permanent-Magnet Synchronous Machine Used for Hybrid Electric Vehicles; Ping Zheng et al.; Electromagnetic Launch Technology, 2008 14th Symposium on; Digital Object Identifier: 10.1109/ELT.2008.69; Publication Year: 2008, pp. 1-5.*

Modeling and simulation of a dual clutch hybrid vehicle powertrain; Joshi, A.S.; Shah, N. P.; Mi, C.; Vehicle Power and Propulsion Conference, 2009. VPPC '09. IEEE; Digital Object Identifier: 10.1109/VPPC.2009.5289682 Publication Year: 2009, pp. 1666-1673.*

Lambda Characterization of Diesel-CNG Dual Fuel Engine; Saraf, R.R.; Thipse, S.S.; Saxena, P.K.; Environmental and Computer Science, 2009. ICECS '09. Second International Conference on; Digital Object Identifier: 10.1109/ICECS.2009.29 Publication Year: 2009, pp. 170-174.*

Analysis of energy consumption and powertrain parameters optimization of BEV based on running cycle;Zhou Bing et al.;Computer-Aided Industrial Design & Conceptual Design (CAIDCD), 2010 IEEE 11th International Conference on; vol. 2; Digital Object Identifier: 10.1109/CAIDCD.2010.5681973; Publication Year: 2010; p. 1284-1290.*

The Effect of an SI Engine Using Butanol-Gasoline Blended Fuel on Performance and Enviroment; Yang Xiaolong et al.; Energy and Environment Technology, 2009. ICEET '09. International Conference on; vol. 1; Digital Object Identifier: 10.1109/ICEET.2009.104; Publication Year: 2009, pp. 402-405.*

* cited by examiner

CONTROL DEVICE AND CONTROL METHOD OF HYBRID VEHICLE

This nonprovisional application is based on Japanese Patent Application No. 2008-258647 filed on Oct. 3, 2008 with the Japan Patent Office, the entire contents of which are hereby incorporated by reference.

BACKGROUND OF THE INVENTION

1. Field of the Invention

The present invention relates to control of a hybrid vehicle, and particularly to control of a vehicle generating a creep torque.

2. Description of the Background Art

In a vehicle having a multi-stage or non-stage transmission, a creep torque that propels a vehicle at an extremely low speed occurs even when an accelerator pedal is not pressed down, as long as a drive position (forward or reverse gear) is selected. An electric vehicle that generates a vehicle drive power by an electric motor employs a structure in which the drive power generated by the motor generates a creep force. A hybrid vehicle that generates a vehicle drive power by both an engine and an electric motor employs a structure in which the drive power generated by at least one of the engine and the motor generates a creep force.

Japanese Patent Laying-Open No. 2006-050811 has disclosed an electric vehicle that can appropriately perform creep-cut according to a situation of a vehicle when a brake pedal is pressed down so that a vehicle drivability can be improved and an electric power consumption can be reduced.

The electric vehicle disclosed in Japanese Patent Laying-Open No. 2006-050811 is an electric vehicle that generates a creep torque from the drive power generated by the electric motor when a predetermined condition is satisfied. In this electric vehicle, a creep torque command value is primarily set according to a vehicle speed during generation of the creep torque. When the brake pedal is pressed down, a torque upper-limit value is set according to a press-down degree of the brake. A smaller one of the primarily set creep torque command value and the torque upper-limit value is set as a final creep torque command value. The setting of the torque upper-limit value is changed according to the vehicle situations such as changes in vehicle speed and press-down amount of the brake. Particularly, when it is estimated from the vehicle situations that a driver intends to reduce a speed, the final creep torque command value is set smaller than the primarily set creep torque command value.

The electric vehicle disclosed by Japanese Patent Laying-Open No. 2006-050811 includes a brake sensing unit for sensing a brake pedal operation by the driver, a vehicle speed sensing unit for sensing a vehicle speed of an electric vehicle, a first creep torque setting unit for setting the creep torque command value according to the vehicle speed based on a predetermined basic characteristic line in an operation of generating the creep torque, and a creep torque cut unit for setting an upper value of the creep torque according to the press-down amount of the brake when the driver steps down the brake pedal. The creep torque cut unit includes a plurality of creep torque upper-limit setting units for setting the upper limits of the creep torques based on a plurality of predetermined upper-limit value setting characteristic lines that set the upper limit values of the creep torque according to the press-down amount of the brake, respectively, a creep torque upper-limit value setting selection unit for selecting one from among the plurality of creep torque upper-limit value setting units according to the vehicle situation of the electric vehicle, and a second creep torque setting unit for setting the torque upper-limit value as the command value of the creep torque when the creep torque command value set by the first creep torque setting unit is larger than the torque upper-limit value set by the selected creep torque upper-limit value setting unit.

In the electric vehicle disclosed in Japanese Patent Laying-Open No. 2006-050811, when the brake pedal is pressed down during generation of the creep torque, the creep torque can be cut owing to provision of the upper limit value of the creep torque, and also the upper limit value can be set by selectively using the plurality of the characteristic lines for setting the upper limit values of the creep torque according to the vehicle situation. Therefore, the creep torque can be appropriately generated according to the vehicle situation even when the brake pedal is pressed down so that the drivability can be improved, and the wasteful power consumption can be reduced.

In the hybrid vehicle that uses, as the drive power source(s), at least one of the engine and the electric motor coupled together via a power splitting mechanism having a planetary gear mechanism, when the creep torque can be generated from only the output of the engine, it is not necessary to generate the torque from the motor. When the creep torque is reduced during stop of the vehicle in the above state, a pressing force between gears of the power splitting mechanism lowers so that a gear rattle may occur.

However, Japanese Patent Laying-Open No. 2006-050811 has neither disclosed nor suggested a problem of such a gear rattle as well as measures for it.

SUMMARY OF THE INVENTION

An object of the invention is to provide a control device and a control method that can reduce an unnecessary creep torque and also can suppress a gear rattle in a gear mechanism during stop of a vehicle that uses, as a drive power source(s), at least one of an engine and an electric motor coupled via the gear mechanism.

A control device according to the invention controls a hybrid vehicle using, as a drive power source, at least one of an engine and an electric motor coupled together via a gear mechanism. The engine is controlled to attain one of a stand-alone drive state for driving in an idle state and a load drive state providing a larger torque than the stand-alone drive state. The control device includes a first calculating unit for calculating a creep torque request value indicating a request value of a creep torque propelling the vehicle at an extremely low speed even when a driver does not make an acceleration request; a second calculating unit for calculating an engine torque request value indicating a request value of an output torque of the engine; a third calculating unit for calculating, as a motor torque request value indicating a request value of an output torque of the motor, a torque obtained by subtracting, from the creep torque request value, a value of a torque propelling the vehicle when the engine provides a torque corresponding to the engine torque request value; and a control unit for controlling the engine based on the engine torque request value and controlling the motor based on the motor torque request value. The first calculating unit decreases the creep torque request value to a predetermined value according to increase in a brake torque of the vehicle when switching conditions including a first condition that the vehicle is in a stop state and a second condition that the engine is in the load drive state are satisfied. The predetermined value is a value avoiding a situation that the motor torque request value falls within a predetermined region in which said motor torque request value being substantially zero.

Preferably, the predetermined value is substantially larger than zero.

More preferably, the predetermined value is a value causing the motor torque request value to exceed an upper limit value of the predetermined region.

More preferably, the second calculating unit restricts the engine torque request value in the load drive state to a preset value when the vehicle is in the stop state. The predetermined value is a value causing the motor torque request value to become close to an upper limit torque in the predetermined region when the engine torque request value is restricted to the preset value in the load drive state.

More preferably, the first calculating unit decreases the creep torque request value substantially to zero with increase in the brake torque when the switching conditions are not satisfied.

More preferably, the first calculating unit calculates the creep torque request value, using a first map decreasing the creep torque request value substantially to zero with increase in the brake torque, when the switching conditions are not satisfied, and the first calculating unit calculates the creep torque request value, using a second map decreasing the creep torque request value substantially to the predetermined value with increase in the brake torque when the switching conditions are satisfied.

More preferably, the switching conditions further include a third condition that a drive range of the vehicle is a forward drive range.

According to the invention, when the vehicle is in the stop state and the engine is in the load drive state, the switching conditions are satisfied. When this switching conditions are satisfied, the creep torque request value is set to the value avoiding the situation that the motor torque request value (output torque of the motor) falls within the predetermined region to attain substantially zero, according to the increase in the brake torque. This suppresses lowering of the pressing force between gears in the gear mechanism, and suppresses generation of a gear rattle. Consequently, it is possible to reduce an unnecessary creep torque during stop of the vehicle and also to suppress the gear rattle that may occur in the gear mechanism.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Embodiments of the invention will now be described with reference to the drawings. In the following description, the same parts bear the same reference numbers and the same names, and achieve the same functions. Therefore, description thereof is not repeated.

Figure 1:
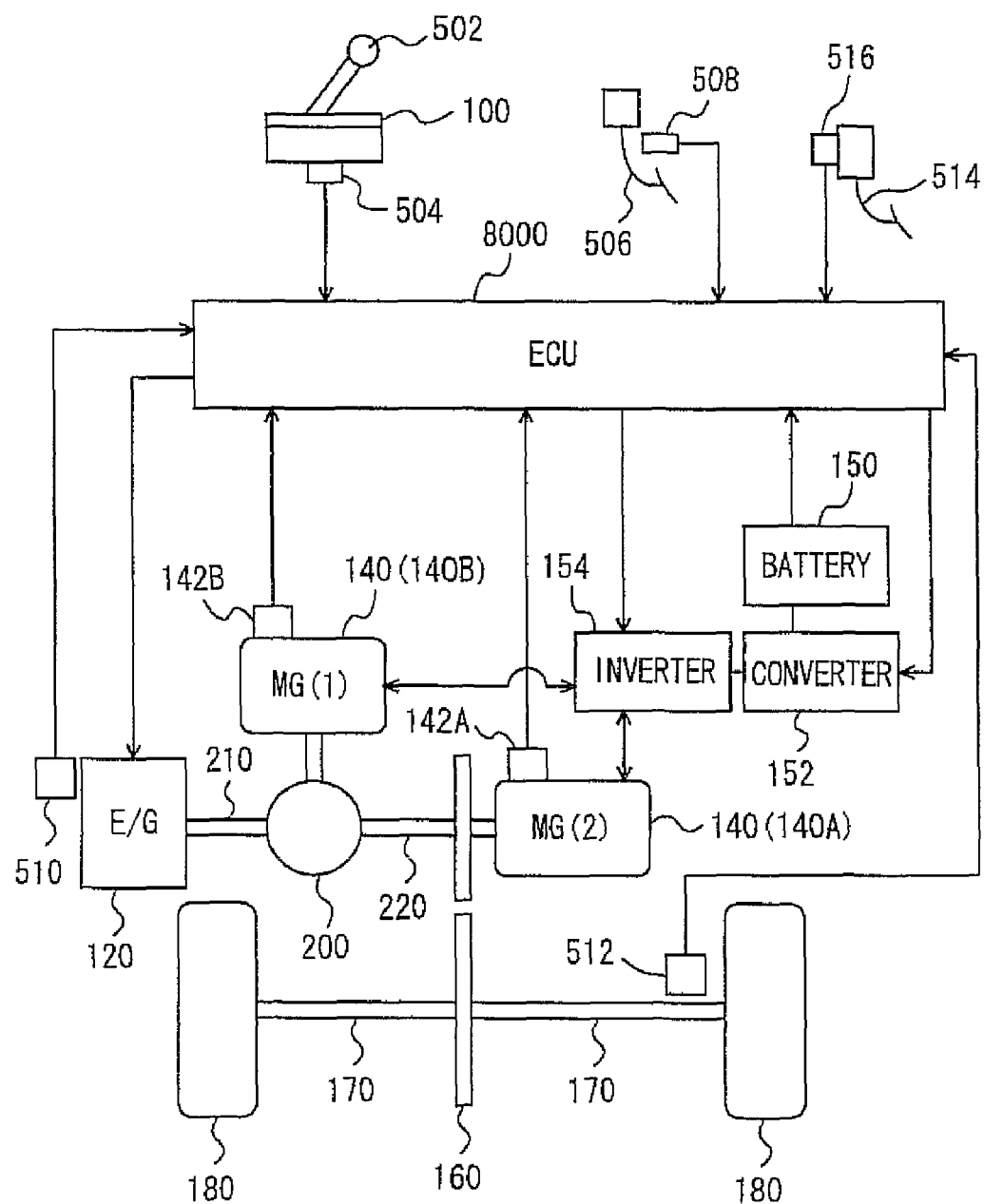
FIG. 1 shows a structure of a vehicle equipped with a control device according to an embodiment of the invention.

Referring to FIG. 1, description will be given on a control block diagram of an overall hybrid vehicle equipped with a control device according to the embodiment. The hybrid vehicle that can employ the control device according to the invention is not restricted to the hybrid vehicle shown in FIG. 1, and may be a hybrid vehicle of another form.

The hybrid vehicle includes an engine 120, a motor generator 140A (MG(2) 140A) and a motor generator 140B (MG(1) 140B). For the sake of illustration, MG(2) 140A and MG(1) 140B may be referred to as motor generators 140 when it is not necessary to discriminate between them.

Motor generator 140 can selectively function as a generator and an electric motor depending on a running state of the hybrid vehicle. A rotation shaft of motor generator 140 transmits a drive power via drive shafts 170 to drive wheels 180. The vehicle runs using the drive power provided from motor generator 140. When motor generator 140 functions as the generator, regenerative braking is performed. When motor generator 140 functions as the generator, kinetic energy of the vehicle is converted to electric energy and the vehicle decelerates.

In addition to the above components, the hybrid vehicle includes a reducer 160 for transmitting the drive power generated by engine 120 and motor generator 140 to drive wheels 180 and transmitting the drive of drive wheels 180 to engine 120 and motor generators 140, a power splitting mechanism 200 that has an input shaft 210 connected to a crank shaft of engine 120 and can distribute the drive power generated by engine 120 via an output shaft to two paths connected to drive wheels 180 and MG(1) 140B, respectively, a battery 150 storing an electric power for driving motor generator 140, an inverter 154 that performs current control by performing conversion between the DC power of battery 150 and the AC power of MG(2) 140A and MG(1) 140B, an ECU 8000 controlling the overall hybrid system to achieve the most efficient running of the hybrid vehicle, and the others.

Inverter 154 operates motor generator 140 as an electric motor or a generator based on a control signal provided from ECU 8000. For operating motor generator 140 as the motor, inverter 154 converts the DC power of battery 150 to the AC power, and supplies it to motor generator 140. By controlling the electric power supplied to motor generator 140, inverter 154 controls motor generator 140 to attain the revolution speed and revolution direction requested by the control signal provided from ECU 8000.

Further, a booster converter 152 is arranged between battery 150 and inverter 154. Since a rated voltage of battery 150 is lower than the rated voltages of MG(2) 140A and MG(1) 140B, booster converter 152 boosts the electric power of battery 150 when the power of battery 150 is to be supplied to MG(2) 140A and MG(1) 140B. When battery 150 is to be charged with the power generated by MG(2) 140A and MG(1) 140B, the booster converter steps down the electric power.

ECU 8000 is connected via a harness and the like to resolver circuits 142A and 142B, a shift position sensor 504, an accelerator position sensor 508, an engine revolution speed sensor 510, a vehicle speed sensor 512 and a brake stepping force sensor 516.

Resolver circuit 142A senses the revolution speed and revolution direction of MG(2) 140A. Resolver circuit 142B senses the revolution speed and revolution direction of MG(1) 140B. Shift position sensor 504 senses a position of a shift lever 502 that is movable along a shift path formed in a shift gate 100. Accelerator position sensor 508 senses a position of an accelerator pedal 506 (i.e., accelerator position ACC). Engine revolution speed sensor 510 senses a revolution speed (engine revolution speed NE) of the crankshaft that is the output shaft of engine 120. Vehicle speed sensor 512 senses the revolution speed of drive shaft 170 as a vehicle speed V. Brake stepping force sensor 516 senses a stepping force (braking force) applied on brake pedal 514 by a driver. Each sensor transmits a signal representing a result of the sensing to ECU 8000.

ECU 8000 controls devices and the like to attain the desired running state of the vehicle based on signals sent from resolver circuits 142A and 142B, shift position sensor 504, accelerator position sensor 508, engine revolution speed sensor 510 and vehicle speed sensor 512 as well as maps and programs stored in a ROM (Read Only Memory).

When shift lever 502 is in a forward drive position and thereby a selected shift range is a forward drive range, ECU 8000 controls MG(2) 140A and MG(1) 140B to generate a torque for forwardly driving the vehicle.

ECU 8000 switches the drive state of engine 120 between a stand-alone drive state and a load drive state according to the running situation of the vehicle. In the stand-alone drive state, engine 120 is controlled to keep an idle state. In the load drive state, engine 120 is controlled to keep a state for providing a larger torque than the stand-alone drive state.

Figure 2:
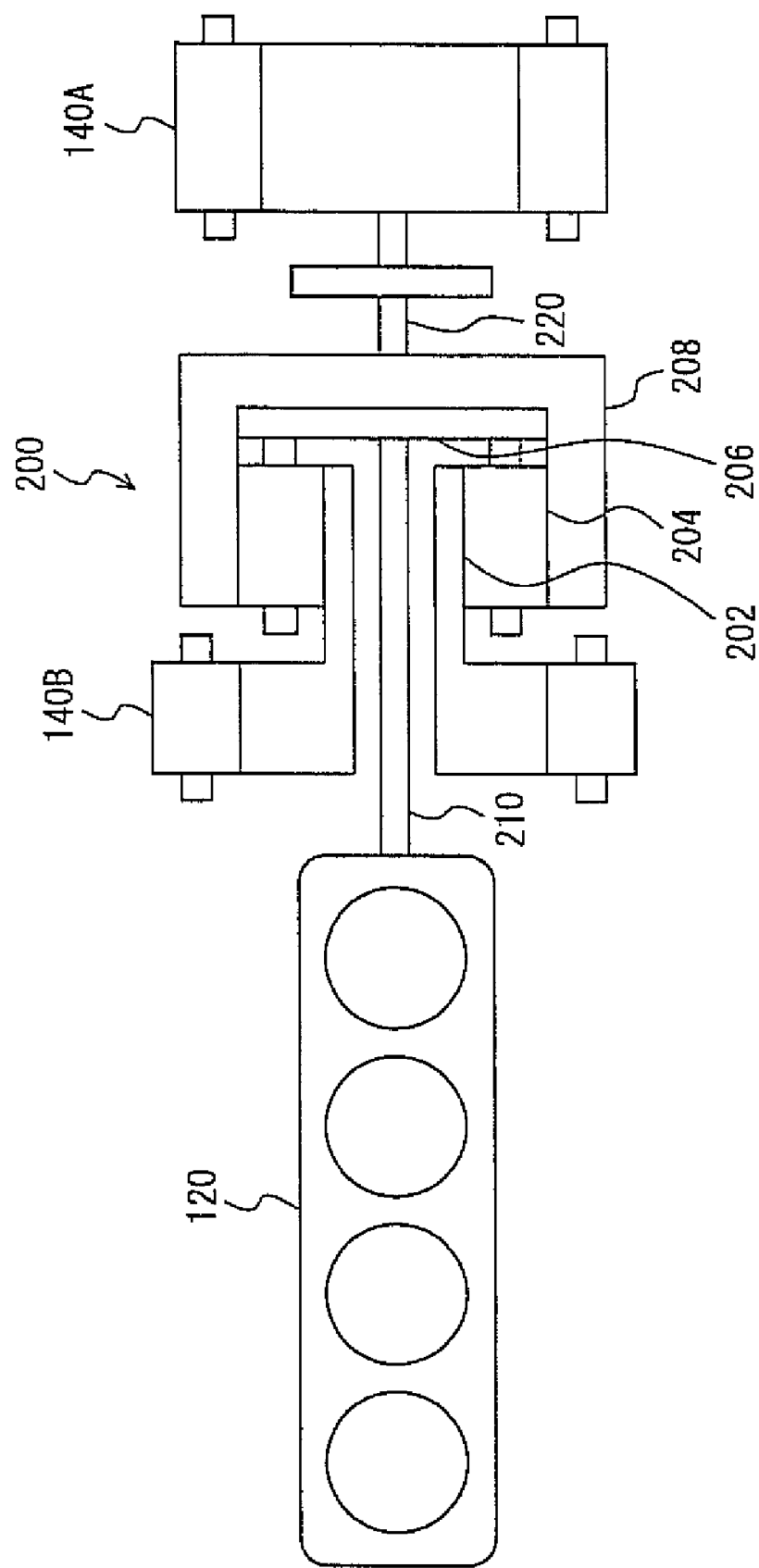
FIG. 2 shows a power splitting mechanism in FIG. 1.

Referring to FIG. 2, power splitting mechanism 200 will be further described below. Power splitting mechanism 200 is formed of a planetary gear including a sun gear (S) 202 which will be simply referred to as a "sun gear 202" hereinafter, pinion gears 204, a carrier (C) 206 which will be simply referred to as a "carrier 206" hereinafter) and a ring gear (R) 208 which will be simply referred to as a "ring gear 208" hereinafter.

Pinion gears 204 are engaged with sun gear 202 and ring gear 208. Carrier 206 rotatably carries pinion gears 204. Sun gear 202 is coupled to a rotation shaft of MG(1) 140B. Carrier 206 is coupled to the crank shaft of engine 120. Ring gear 208 is coupled to an output shaft 220.

Figure 3:
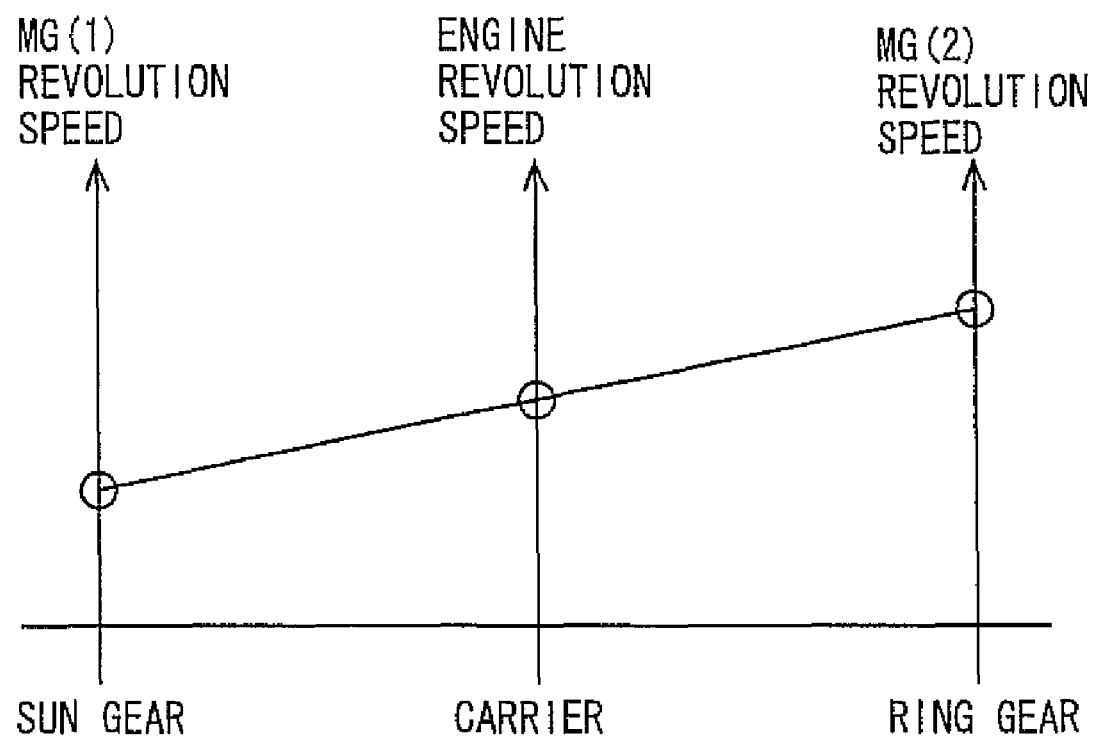
FIG. 3 is an alignment chart illustrating a relationship in revolution speed between an engine, an MG(1) and an MG(2).

Since engine 120, MG(1) 140B and MG(2) 140A are coupled via power splitting mechanism 200 formed of the planetary gear, the revolution speeds of engine 120, MG(1) 140B and MG(2) 140A exhibit a relationship represented by straight line in alignment chart, e.g., as shown in FIG. 3 (which represents an example of the relationship during stationary driving). Thus, power splitting mechanism 200 has characteristics that the revolution speed of one of its three rotation axes is determined when revolution speeds of the other two revolution axes are determined.

In the hybrid vehicle having the above structure, when the selected shift range is the forward drive range (or reverse drive range) and accelerator pedal 506 is not operated (i.e., accelerator position ACC is 0%), ECU 8000 generates a torque that propels the hybrid vehicle at an extremely low speed (and will be referred to as a "creep torque" hereinafter). In this operation, generation of an unnecessary creep torque can be suppressed by reducing the creep torque according to the brake pedal stepping force, and thereby wasteful energy consumption can be reduced.

However, when the creep torque is reduced during the stop of the vehicle and engine 120 is in the load drive state, the creep torque can be generated only from the torque that is transmitted from engine 120 via power splitting mechanism 200 to output shaft 220 (and will also be referred to as an "engine-direct torque" hereinafter), and it is not necessary to generate the torque from MG(2) 140A. Thereby, when the output torque of MG(2) 140A decreases to fall within a region (which may also be referred to as a "noise generation region in vehicle stop state" hereinafter) defined between +α and −α and substantially including zero, pressing forces between pinion gears 204, sun gear 202 and ring gear 208 in power splitting mechanism 200 decrease. Due to this, pulsation or surging of the output torque of engine 120 may continuously cause a gear rattle between the gears in power splitting mechanism 200.

For reducing the wasteful energy consumption and suppressing the above gear rattle, the control device of the vehicle according to the embodiment has the following distinctive feature. When the vehicle is in the stop state and engine 120 is in the load drive state, the control device switches a map used for calculating a creep torque reflection rate used for calculating the creep torque from an ordinary map to a gear rattle prevention map (i.e., a map for preventing the gear rattle), and thereby avoids such a situation that the output torque of MG(2) 140A falls within the noise generation region during the stop of vehicle.

Figure 4:
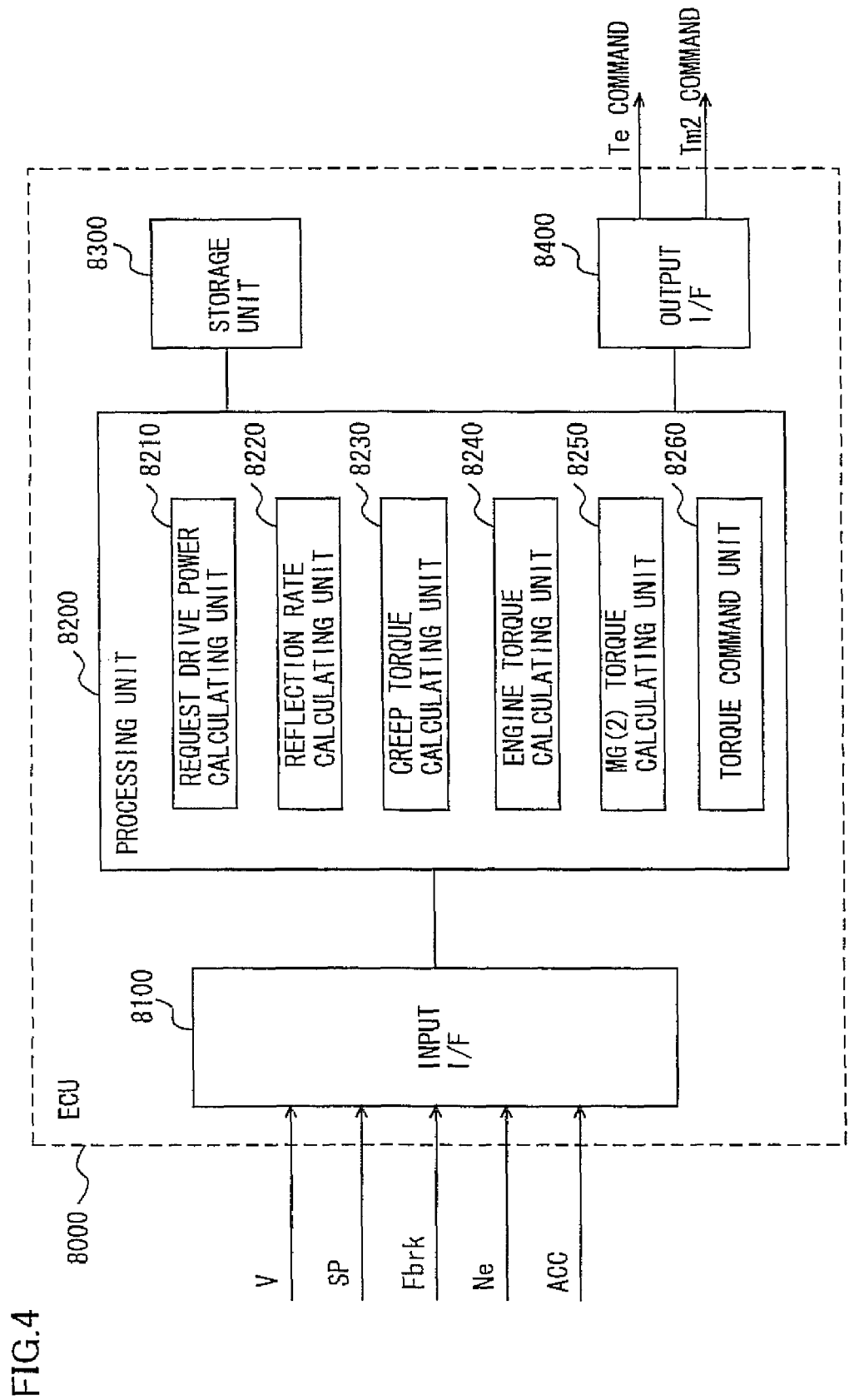
FIG. 4 is a functional block diagram of the control device according to the embodiment of the invention.

FIG. 4 is a functional block diagram exhibited when ECU 8000, i.e., the control device of the vehicle according to the embodiment generates the creep torque.

ECU 8000 includes an input interface 8100 receiving information from various sensors and the like, a storage unit 8300 storing various kinds of information, programs, thresholds, maps and the like for reading data from a processing unit 8200 or storing the data thereinto when necessary, and an output interface 8400 providing results of processing by processing unit 8200 to various devices and units.

Storage unit 8300 stores in advance a drive torque request value map, a creep torque reflection rate map and an engine power request value map, each of which is used for calculating the creep torque.

Figure 5:
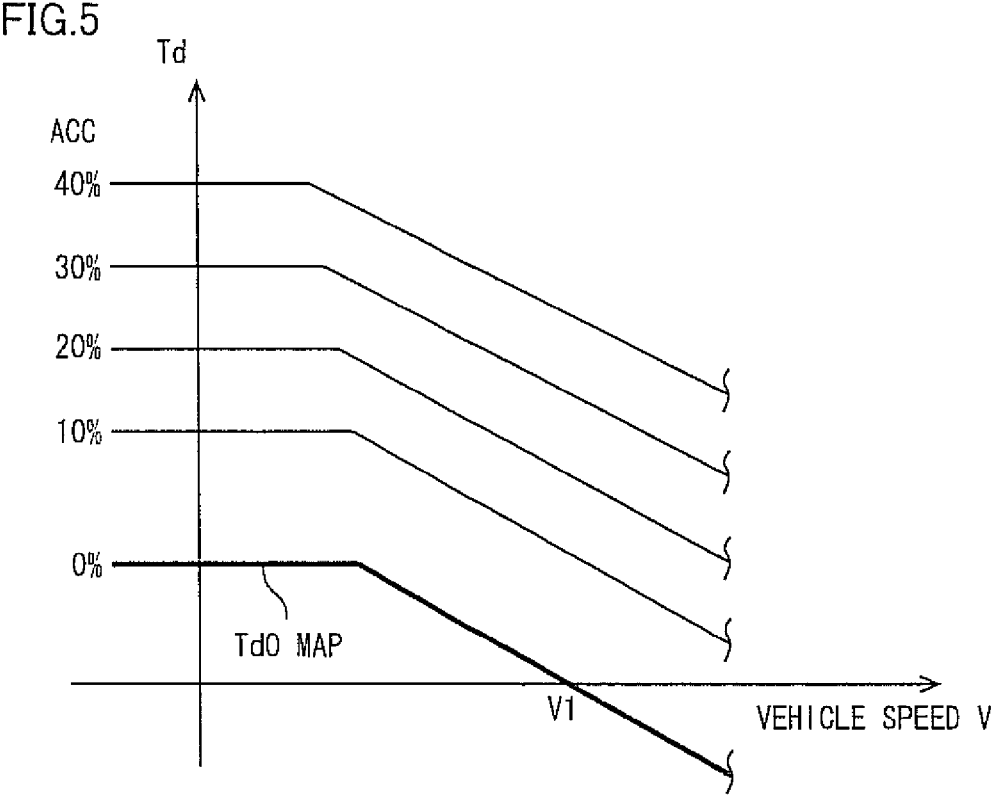
FIG. 5 shows a drive torque quest value map.

FIG. 5 shows the drive torque request value map. In this drive torque request value map, a drive torque request value Td indicating the drive torque requested by the vehicle is preset using vehicle speed V and accelerator position ACC as parameters. As shown in FIG. 5, according to the map of a drive torque request value (which may also be referred to as a "Td0 map" hereinafter) requested when accelerator position ACC is 0%, the drive torque request value takes a positive value and does not attain 0 when vehicle speed V is lower than V1. Drive torque request value Td0calculated based on this Td0 map is used for calculating the creep torque.

Figure 6:
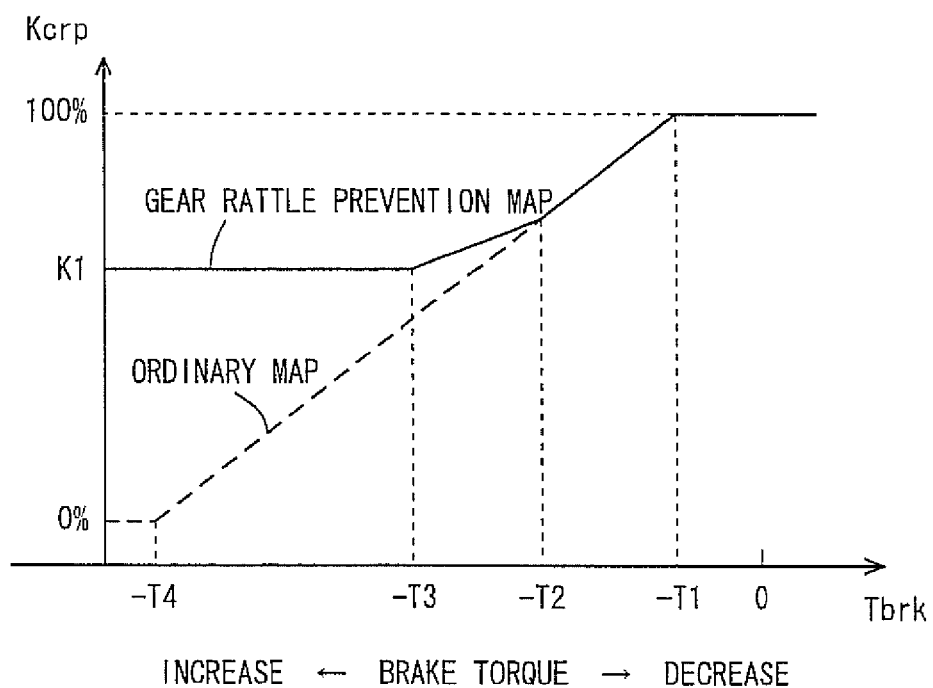
FIG. 6 shows a creep torque reflection rate map.

FIG. 6 shows the creep torque reflection rate map. In this embodiment, a creep torque request value Tp is calculated by (Tp=(drive torque request value Td0)×(creep torque reflection rate Kcrp)) as will be described later. This creep torque reflection rate map sets creep torque reflection rate Kcrp, using a brake torque Tbrk as a parameter. Brake torque Tbrk given by the abscissa in FIG. 6 is positive when it acts in the vehicle forward-running direction. Thus, when brake torque Tbrk is lower than 0, this indicates that the brake torque is practically acting on the vehicle. As brake torque Tbrk decreases from 0, the brake torque (braking force) acting on the vehicle increases. Brake torque Tbrk is calculated based on a sensed value (brake pedal stepping force) of brake stepping force sensor 516.

As shown in FIG. 6, two kinds of maps, i.e., the ordinary map and the gear rattle prevention map are preset for use as the creep torque reflection rate map.

In the ordinary map, creep torque reflection rate Kcrp is set to 100% in a range of (Tbrk>−T1). In a range of (−T4<Tbrk<−T1), creep torque reflection rate Kcrp decreases with decrease in Tbrk. In a range of (Tbrk<−T4), creep torque reflection rate Kcrp is set to 0%. Thus, in the ordinary map, creep torque reflection rate Kcrp is reduced to up to 0% according to the reduction of brake torque Tbrk (increase in brake torque acting on the vehicle) so that the generation of the unnecessary creep torque is suppressed and the wasteful energy consumption is reduced.

According to the gear rattle prevention map, creep torque reflection rate Kcrp is set similarly to the ordinary map when Tbrk is in a range of (Tbrk>−T2). In a range of (Tbrk<31 T2), creep torque reflection rate Kcrp is reduced with lowering of Tbrk at a reduction rate lower than that in the ordinary map. In a range of (Tbrk<−T3), creep torque reflection rate Kcrp is set to K1 percent (e.g., about 60%). Thus, according to the gear rattle prevention map, creep torque reflection rate Kcrp is reduced to K1 percent according to the lowering of Tbrk so that (100−K1) percent of drive torque request value Td0 is suppressed as the unnecessary creep torque, and the remaining K1 percent is operative as the creep torque required for preventing the gear rattle.

Figure 7:
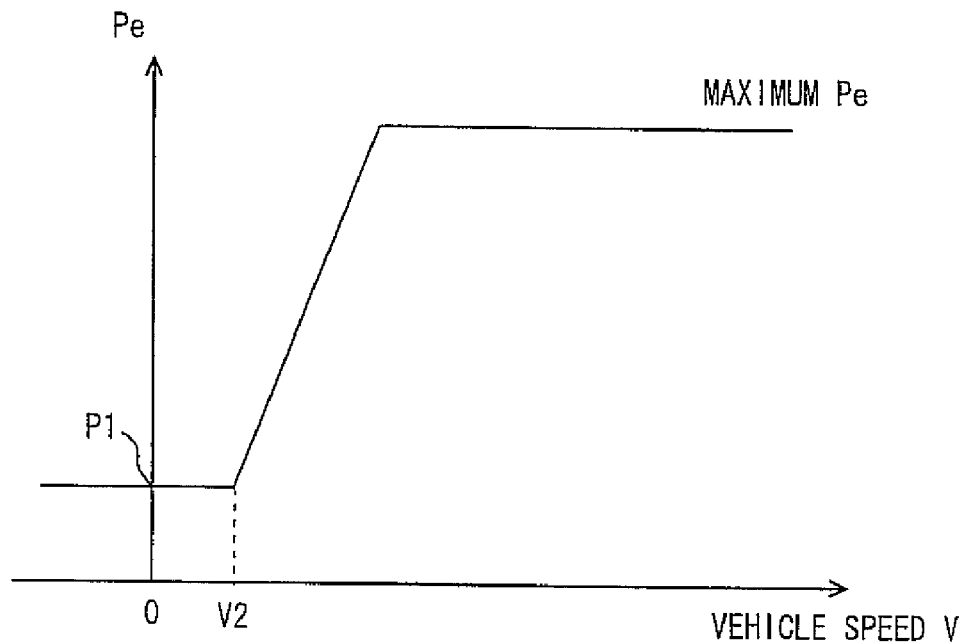
FIG. 7 shows an engine power request value map.

FIG. 7 shows the engine power request value map. This engine power request value map sets an engine power request value Pe used for controlling the output torque in the load drive state of engine 120, using vehicle speed V as a parameter. As shown in FIG. 7, engine power request value Pe increases with increase in vehicle speed V when vehicle speed V is larger than V2 (V>V2). In a vehicle speed range of (V<V2), engine power request value Pe is set to a lower-limit power value P1. Thus, for preventing engine noises and others, engine power request value Pe is restricted to lower-limit power value P1 when vehicle speed V is equal or close to 0.

Returning to FIG. 4, processing unit 8200 includes a request drive power calculating unit 8210, a reflection rate calculating unit 8220, a creep torque calculating unit 8230, an engine torque calculating unit 8240, an MG(2) torque calculating unit 8250 and a torque command unit 8260.

When a predetermined creep torque generation condition (e.g., that accelerator position ACC is 0%) is satisfied, request drive power calculating unit 8210 calculates drive torque request value Td0 based on vehicle speed V and Td0 map shown in FIG. 5 (i.e., the map of the request drive torque corresponding to accelerator position ACC is 0%).

Reflection rate calculating unit 8220 selects one of the two creep torque reflection rate maps (ordinary map and gear rattle prevention map) shown in FIG. 6 based on whether a predetermined map switching condition is satisfied or not, and calculates creep torque reflection rate Kcrp based on the selected map. The predetermined map switching condition is that the shift range is the forward drive range, vehicle speed V is nearly zero (V≈0) and engine 120 is in the load drive state. When this map switching condition is not satisfied, reflection rate calculating unit 8220 selects the ordinary map. When this map switching condition is satisfied, it selects the gear rattle prevention map.

Creep torque calculating unit 8230 calculates, as creep torque request value Tp, a product of drive torque request value Td0 and creep torque reflection rate Kcrp.

When engine 120 is in the load drive state, engine torque calculating unit 8240 calculates engine power request value Pe based on vehicle speed V and the engine power request value map shown in FIG. 7, and calculate an engine torque request value Te from ((engine power request value Pe)/(engine revolution speed NE)). When engine 120 is in the stand-alone drive state, engine torque calculating unit 8240 sets, as engine torque request value Te, a preset value that is smaller than at least aforementioned lower-limit power value P1.

MG(2) torque calculating unit 8250 calculates an MG(2) torque request value Tm2 based on creep torque request value Tp and engine torque request value Te.

Figure 8:
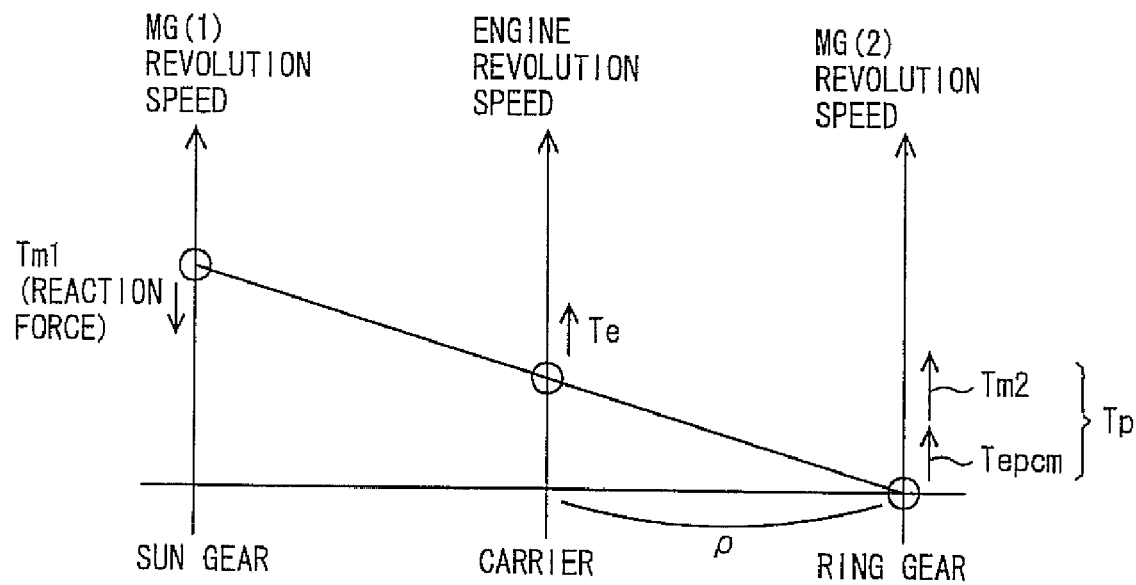
FIG. 8 shows a relationship between a creep torque request value, an engine torque request value and an MG-(2) torque request value.

Referring to FIG. 8, a manner of calculating MG(2) torque request value Tm2 will be described. FIG. 8 shows a relationship between creep torque request value Tp, engine torque request value Te and MG(2) torque request value Tm2. As shown in FIG. 8, creep torque request value Tp is expressed by the following equation (1):

$$Tp = Tepcm + Tm2 \quad (1)$$

where Tepcm represents an engine-direct torque value (i.e., a value of the torque transmitted from engine 120 to output shaft 220 via power splitting mechanism 200) exhibited when engine 120 provides engine torque request value Te. Thus, creep torque request value Tp is a sum of engine-direct torque value Tepcm and MG(2) torque request value Tm2.

When a gear ratio between carrier 206 and ring gear 208 is ρ, a relationship that engine-direct torque value Tepcm is equal to $((1/(1+\rho)) \times Te)$ is established so that the above equation (1) can be transformed into the following equation (2):

$$Tm2 = Tp - Tepcm = Tp - (1/(1+\rho)) \times Te \quad (2)$$

MG(2) torque calculating unit 8250 substitutes creep torque request value Tp(=Td0×Kcrp) and engine torque request value Te into the above equation (2) to calculate MG(2) torque request value Tm2. Thus, MG(2) torque calculating unit 8250 calculates, as MG(2) torque request value Tm2, a remaining torque obtained by removing engine-direct torque value Tepcm from creep torque request value Tp. As is apparent from this calculation manner, calculated MG(2) torque request value Tm2 decreases as engine torque request value Te increases when creep torque request value Tp is constant. In the case of ((creep torque request value Tp)<Tepcm), calculated MG(2) torque request value Tm2 may be negative.

When the selected shift range is the reverse drive range, Tp is smaller than 0 (Tp<0) and Tepcm is always positive so that (Tm2<−Tepcm) is derived from the foregoing equation (1), and Tm2 is always negative. Thus, when the selected shift range is the reverse drive range, Tm2 does not become substantially zero.

Returning to FIG. 4, torque command unit 8260 provides a command to engine 120 for controlling the output torque of engine 120 to attain engine torque request value Te, and provides a command to inverter 154 for controlling the output torque of MG(2) 140B to attain MG(2) torque request value Tm2.

Each of the functions described above may be implemented by software, and also may be implemented by hardware. In the following description, the above functions are implemented by software, and more specifically by processing unit 8200, i.e., the CPU executing the programs stored in storage unit 8300.

Figure 9:
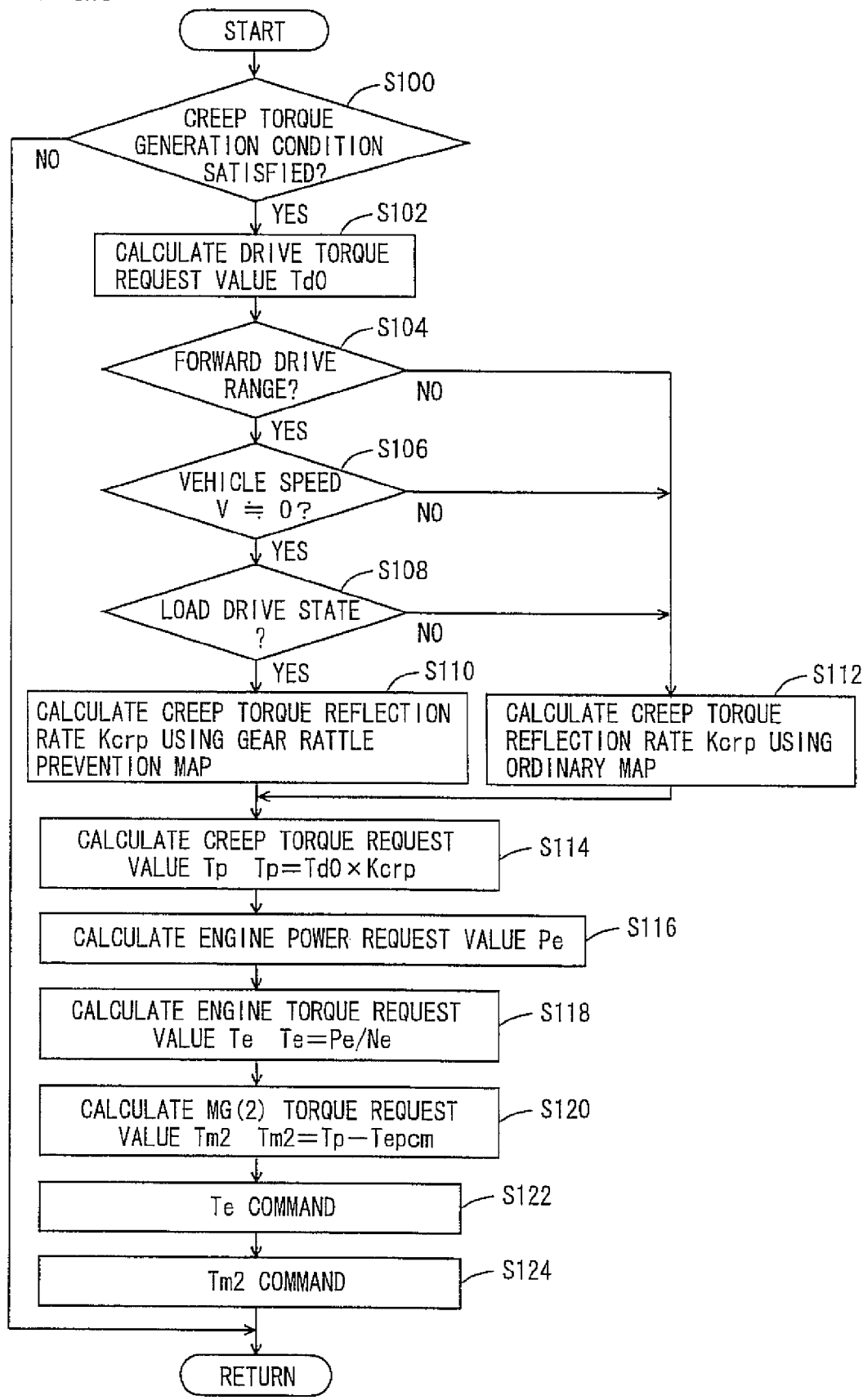
FIG. 9 is a flowchart showing a control structure of an ECU.

Referring to FIG. 9, description will be given on the control structure of the program that is executed by ECU 8000, i.e., the control device according to the embodiment. Execution of this program is repeated in predetermined cycles.

In a step (which may be abbreviated as "S" hereinafter) 100, ECU 8000 determines whether the foregoing predetermined condition of the creep torque generation is satisfied or not. When the creep torque generation condition is satisfied (YES in S100), the process proceeds to S102. Otherwise (NO in S100), the processing ends.

In S102, ECU 8000 calculates the value of drive torque request value Td0 based on the Td0 map shown in FIG. 5.

In S104, ECU 8000 determines whether the shift range is the forward drive range or not. When it is the forward drive range (YES in S104), the process proceeds to S106. Otherwise (NO in S104), the process proceeds to S112.

In S106, ECU 8000 determines whether vehicle speed V is substantially zero (V≈0) or not. When vehicle speed V is substantially zero (YES in S106), the process proceeds to S108. Otherwise (NO in S106), the process proceeds to S112.

In S108, ECU 8000 determines whether engine 120 is in the load drive state or not. When it is in the load drive state (YES in S108), the process proceeds to S110. Otherwise (NO in S108), the process proceeds to S112.

In S110, ECU 8000 selects the gear rattle prevention map from between the two creep torque reflection rate maps shown in FIG. 6, and calculates creep torque reflection rate Kcrp based on the selected gear rattle prevention map.

In S112, ECU 8000 selects the ordinary map from between the two creep torque reflection rate maps, and calculates creep torque reflection rate Kcrp based on the selected ordinary map.

In S114, ECU 8000 calculates, as creep torque request value Tp, a product of drive torque request value Td0 and creep torque reflection rate Kcrp.

In S116, ECU 8000 calculates engine power request value Pe based on vehicle speed V and the engine power request value map shown in FIG. 7.

In S118, ECU 8000 calculates ((engine power request value Pe)/(engine revolution speed NE)) as engine torque request value Te.

In S120, ECU 8000 calculates ((creep torque request value Tp)−(engine-direct torque value Tepcm)) as MG(2) torque request value Tm2. Engine-direct torque value Tepcm is calculated from $((1/(1+(\text{gear ratio } \rho)))\times(\text{engine torque request value Te}))$ as already described.

In S122, ECU 8000 provides, to engine 120, the command for controlling the output torque of engine 120 to attain engine torque request value Te.

In S124, ECU 8000 provides, to inverter 154, the command for controlling the output torque of MG(2) 140A to attain MG(2) torque request value Tm2.

MG(2) torque request value Tm2 that is calculated at the time of creep torque generation by ECU 8000, i.e., the control device according to the embodiment will now be described with reference to FIGS. 10 and 11.

Figure 10:
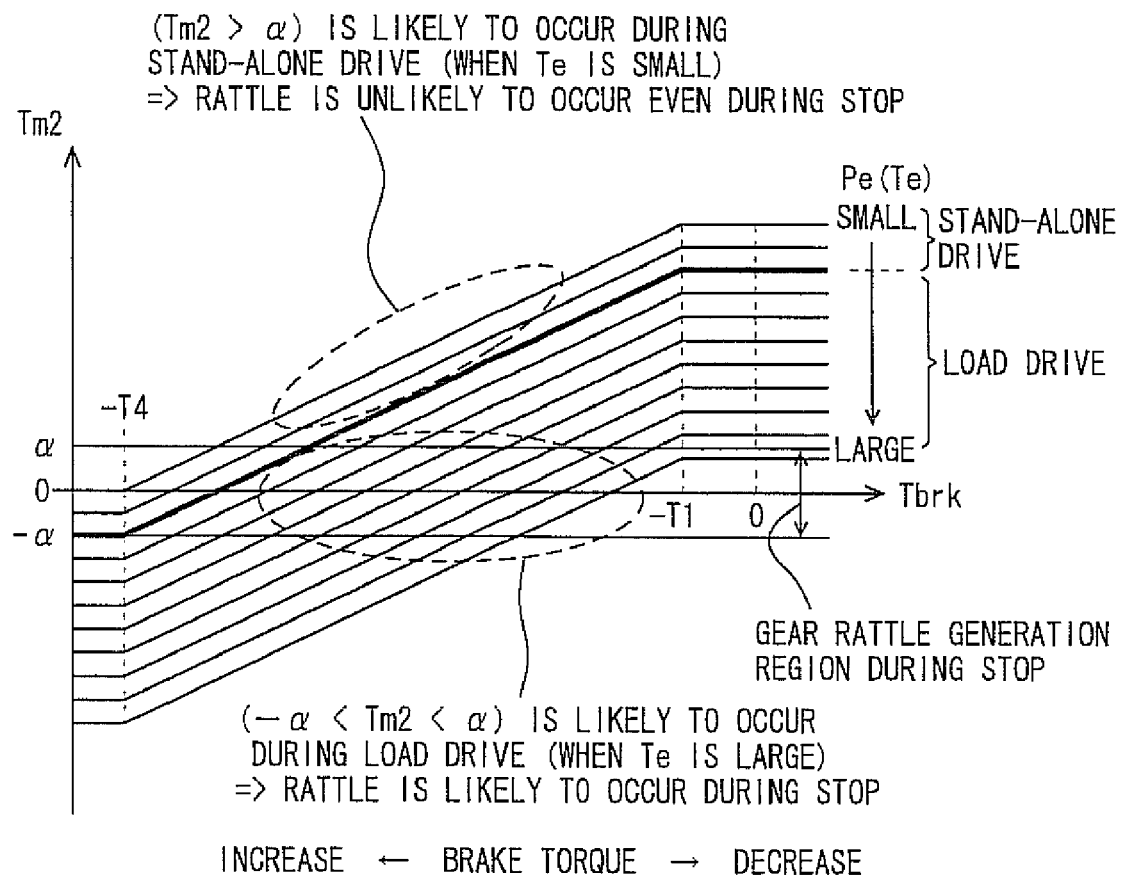
FIG. 10 shows a relationship between a brake torque and the MG-(2) torque request value obtained when the creep torque reflection rate is calculated using an ordinary map.

FIG. 10 shows a relationship between brake torque Tbrk and MG(2) torque request value Tm2 exhibited when creep torque reflection rate Kcrp is calculated based on the ordinary map (S112), using engine power request value Pe (engine torque request value Te) as a parameter.

In the ordinary map, as shown in FIG. 6 already described, creep torque reflection rate Kcrp decreases to 0% with lowering of Tbrk (i.e., increase of the brake torque acting on the vehicle). Since creep torque request value Tp is equal to ((drive torque request value Td0)×(creep torque reflection rate Kcrp)) (S114), creep torque request value Tp decreases to or below about 0 with lowering of brake torque Tbrk.

MG(2) torque request value Tm2 is equal to ((creep torque request value Tp)−(engine-direct torque value Tepcm)) (S120). Therefore, as engine-direct torque value Tepcm increases (i.e., engine torque request value Te increases), MG(2) torque request value Tm2 decreases.

Accordingly, as shown in FIG. 10, when engine 120 is in the stand-alone drive state (when engine torque request value Te is small), creep torque request value Tp must be generated from both engine-direct torque value Tepcm and MG(2) torque request value Tm2. Therefore, MG(2) torque request value Tm2 frequently attains a value larger than upper limit value a of the gear rattle generation region in the vehicle stop state, and the gear rattle is unlikely to occur even in the vehicle stop state.

However, when engine 120 is in the load drive state (when engine torque request value Te is large), the creep torque can be easily generated from only engine-direct torque value Tepcm. Accordingly, MG(2) torque request value Tm2 frequently falls within the gear rattle generation region in the vehicle stop state, and the gear rattle is likely to occur in the vehicle stop state.

Accordingly, when the selected shift range is the forward drive range (YES in S104), vehicle speed V is near zero (V≈0) (YES in S106) and engine 120 is in the load drive state (YES in S108), ECU 8000 according to the embodiment selects the gear rattle prevention map instead of the ordinary map, and calculates creep torque reflection rate Kcrp based on the selected gear rattle prevention map (S110). When the selected shift range is the reverse drive range (NO in S104), ECU 8000 selects the ordinary map (S112). In this case, Tm2 does not become substantially zero even when engine 120 is in the load drive state so that the gear rattle does not occur.

Figure 11:
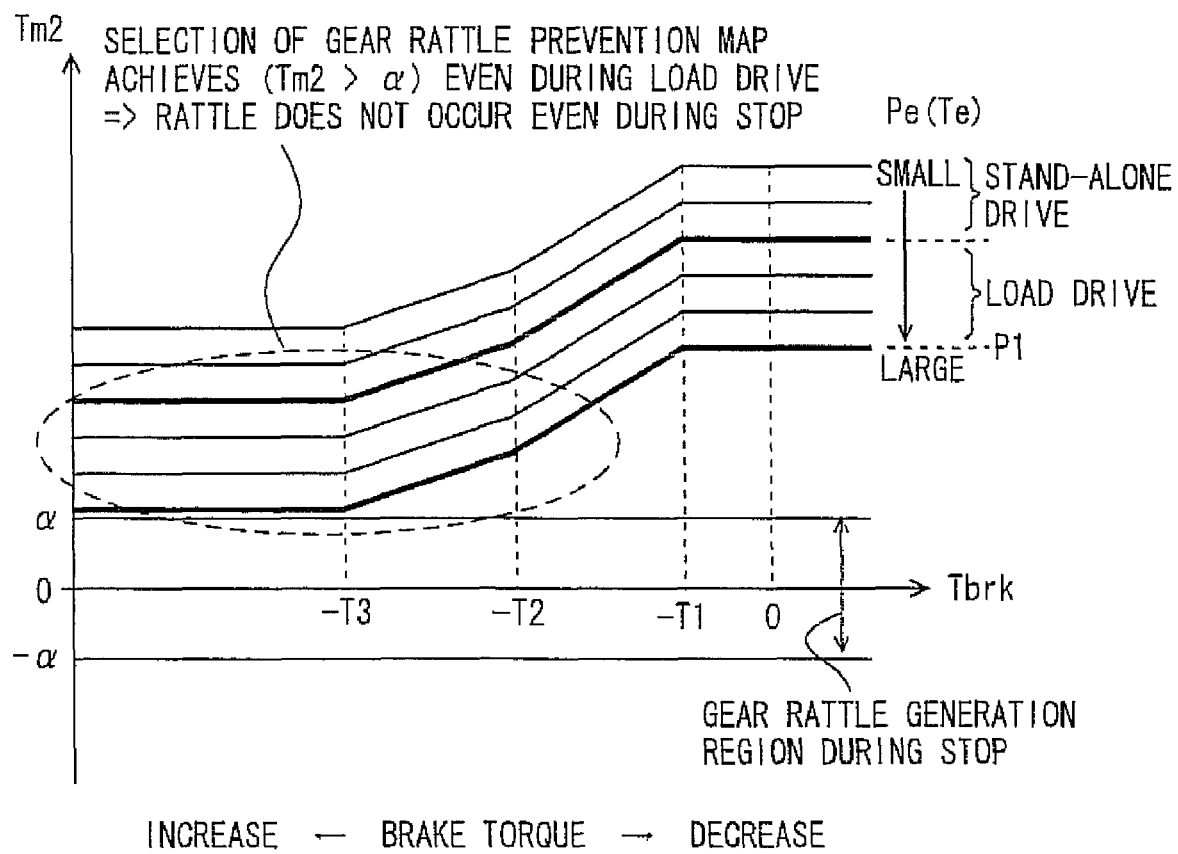
FIG. 11 shows a relationship between the brake torque and the MG-(2) torque request value obtained when the creep torque reflection rate is calculated using a gear rattle prevention map.

FIG. 11 shows a relationship between brake torque Tbrk and MG(2) torque request value Tm2 exhibited when creep torque reflection rate Kcrp is calculated using the gear rattle prevention map (S110), using engine power request value Pe as a parameter.

In the gear rattle prevention map, creep torque reflection rate Kcrp decreases with lowering of Tbrk as already shown in FIG. 6, but creep torque reflection rate Kcrp decreases only to K1 percent. Therefore, when the driver strongly steps down brake pedal 514, creep torque request value Tp decreases below drive torque request value Td0 (creep torque reflection rate Kcrp decreases below 100%), but decreased creep torque request value Tp does not attain 0 but attains only K1 percent of drive torque request value Td0.

Therefore, even when engine 120 is in the load drive state (when engine torque request value Te is large), MG(2) torque request value Tm2 attains such a value that creep torque request value Tp cannot be easily generated only from engine-direct torque value Tepcm. Therefore, even when engine 120 is in the load drive state, such a situation can be easily avoided that MG(2) torque request value Tm2 falls within the gear rattle generation region in the vehicle stop state. This suppresses the generation of the gear rattle even in the vehicle stop state.

As shown in foregoing FIG. 7, when vehicle speed V is substantially zero (V≈0), engine power request value Pe is restricted to lower-limit power value P1 (S116) so that the engine noise may be prevented. Therefore, the value of K1 can be set in the gear rattle prevention map assuming that the maximum value of engine power request value Pe in the vehicle stop state is equal to lower-limit power value P1. Thus, the engine torque in the state of ((engine power request value Pe)=(lower-limit power value P1)) is calculated, e.g., from the average value of engine revolution speed NE in the vehicle stop state. Also, it is assumed that the engine torque is equal to Te when Pe is equal to lower-limit power value P1, and ((drive torque request value Td0)×K1) is equal to Tp when vehicle speed V is equal to 0 (vehicle stop state). These values are substituted into the foregoing equation (2). Thereby, the value of K1 can be preset such that MG(2) torque request value Tm2 obtained by the above substitution may not fall within the gear rattle generation region in the vehicle stop state. Thereby, the energy consumption can be reduced to the maximum extent while suppressing the generation of the gear rattle.

As described above, when the vehicle is in the stop state and the engine is in the load drive state, the control device according to the embodiment switches the map for calculating the creep torque reflection rate to be used for calculating the creep torque from the ordinary map to the gear rattle prevention map. This can avoid the situation that the MG2 torque falls within the gear rattle generation region in the vehicle stop state. Therefore, the wasteful power consumption can be reduced and, at the same time, it is possible to suppress the generation of the gear rattle in the power splitting mechanism arranged between the engine and the MG2.

Although the present invention has been described and illustrated in detail, it is clearly understood that the same is by way of illustration and example only and is not to be taken by way of limitation, the scope of the present invention being interpreted by the terms of the appended claims.

What is claimed is:

1. A control device of a vehicle using, as a drive power source, at least one of an engine and an electric motor coupled together via a gear mechanism, said engine being controlled to attain one of a stand-alone drive state for driving in an idle state and a load drive state for providing a larger torque than said stand-alone drive state, and said control device comprising:

a first calculating unit for calculating a creep torque request value indicating a request value of a creep torque propelling said vehicle at an extremely low speed even when a driver does not make an acceleration request;

a second calculating unit for calculating an engine torque request value indicating a request value of an output torque of said engine based on a speed of said vehicle and a revolution speed of said engine;

a third calculating unit for calculating, as a motor torque request value indicating a request value of an output torque of said motor, a torque by subtracting, from said creep torque request value, a value of a torque propelling said vehicle when said engine provides a torque corresponding to said engine torque request value; and a control unit for controlling said engine based on said engine torque request value and controlling said motor based on said motor torque request value, wherein said first calculating unit decreases said creep torque request value to a predetermined value according to increase in a brake torque of said vehicle when switching conditions including a first condition that said vehicle is in a stop state and a second condition that said engine is in said load drive state are satisfied, and said predetermined value is a value avoiding a situation that said motor torque request value falls within a predetermined region in which said motor torque request value being substantially zero.

2. The control device of the hybrid vehicle according to claim 1, wherein said predetermined value is substantially larger than zero.

3. The control device of the hybrid vehicle according to claim 1, wherein said predetermined value is a value causing said motor torque request value to exceed an upper limit value of said predetermined region.

4. The control device of the hybrid vehicle according to claim 1, wherein said second calculating unit restricts said engine torque request value in said load drive state to a preset value when said vehicle is in the stop state, and said predetermined value is a value causing said motor torque request value to become close to an upper limit torque in said predetermined region when said engine torque request value is restricted to said preset value in said load drive state.

5. The control device of the hybrid vehicle according to claim 1, wherein said first calculating unit decreases said creep torque request value substantially to zero with increase in said brake torque when said switching conditions are not satisfied.

6. The control device of the hybrid vehicle according to claim 5, wherein said first calculating unit calculates said creep torque request value, using a first map decreasing said creep torque request value substantially to zero with increase in said brake torque, when said switching conditions are not satisfied, and said first calculating unit calculates said creep torque request value, using a second map decreasing said creep torque request value substantially to said predetermined value with increase in said brake torque when said switching conditions are satisfied.

7. The control device of the hybrid vehicle according to claim 1, wherein said switching conditions further include a third condition that a drive range of said vehicle is a forward drive range.

8. A control method performed by a control device of a vehicle using, as a drive power source, at least one of an engine and an electric motor coupled together via a gear mechanism, said engine being controlled to attain one of a stand-alone drive state for driving in an idle state and a load drive state for providing a larger torque than said stand-alone drive state, and said control method comprising the steps of:

calculating a creep torque request value indicating a request value of a creep torque propelling said vehicle at an extremely low speed even when a driver does not make an acceleration request;

calculating an engine torque request value indicating a request value of an output torque of said engine based on a speed of said vehicle and a revolution speed of said engine;

calculating, as a motor torque request value indicating a request value of an output torque of said motor, a torque by subtracting, from said creep torque request value, a value of a torque propelling said vehicle when said engine provides a torque corresponding to said engine torque request value; and controlling said engine based on said engine torque request value and controlling said motor based on said motor torque request value, wherein said step of calculating said creep torque request value decreases said creep torque request value to a predetermined value according to increase in a brake torque of said vehicle when switching conditions including a first condition that said vehicle is in a stop state and a second condition that said engine is in said load drive state are satisfied, and said predetermined value is a value avoiding a situation that said motor torque request value falls within a predetermined region in which said motor torque request value being substantially zero.

\* \* \* \* \*

UNITED STATES PATENT AND TRADEMARK OFFICE
CERTIFICATE OF CORRECTION

PATENT NO. : 7,957,856 B2
APPLICATION NO. : 12/558834
DATED : June 7, 2011
INVENTOR(S) : Takao Itoh It is certified that error appears in the above-identified patent and that said Letters Patent is hereby corrected as shown below:

At column 6 line number 57, replace "Td0calculated" with --Td0 calculated --

Signed and Sealed this
Thirteenth Day of November, 2012

David J. Kappos
*Director of the United States Patent and Trademark Office*